(12) United States Patent
De Haan

(10) Patent No.: US 9,196,019 B2
(45) Date of Patent: Nov. 24, 2015

(54) COLOR IMAGE ENHANCEMENT

(75) Inventor: Gerard De Haan, Eindhoven (NL)

(73) Assignee: TP VISION HOLDING B.V., Eindhoven (NL)

( * ) Notice: Subject to any disclaimer, the term of this patent is extended or adjusted under 35 U.S.C. 154(b) by 455 days.

(21) Appl. No.: 12/919,777

(22) PCT Filed: Mar. 10, 2009

(86) PCT No.: PCT/IB2009/051001
§ 371 (c)(1),
(2), (4) Date: Aug. 27, 2010

(87) PCT Pub. No.: WO2009/113023
PCT Pub. Date: Sep. 17, 2009

(65) Prior Publication Data
US 2011/0002540 A1    Jan. 6, 2011

(30) Foreign Application Priority Data
Mar. 13, 2008 (EP) .................... 08305055

(51) Int. Cl.
| | |
|---|---|
| G06T 5/00 | (2006.01) |
| G06T 5/20 | (2006.01) |
| H04N 5/208 | (2006.01) |
| H04N 9/64 | (2006.01) |
| H04N 1/409 | (2006.01) |
| H04N 1/60 | (2006.01) |

(52) U.S. Cl.
CPC . *G06T 5/003* (2013.01); *G06T 5/20* (2013.01); *H04N 1/4092* (2013.01); *H04N 1/6027* (2013.01); *H04N 5/208* (2013.01); *H04N 9/646* (2013.01); *G06T 2207/10024* (2013.01); *G06T 2207/20192* (2013.01)

(58) Field of Classification Search
USPC ......... 382/162, 260–261, 263, 266, 274, 276, 382/282; 348/252, 254–256, 606–607, 625, 348/645; 358/500, 518–520
See application file for complete search history.

(56) References Cited

U.S. PATENT DOCUMENTS

| | | | |
|---|---|---|---|
| 5,982,926 A | 11/1999 | Kuo et al. | |
| 6,028,646 A | 2/2000 | Jeong et al. | |
| 6,400,371 B1 * | 6/2002 | Helman et al. ............... 345/589 |
| 6,449,060 B1 | 9/2002 | Kawai et al. | |
| 6,809,838 B1 | 10/2004 | Gilman et al. | |

(Continued)

FOREIGN PATENT DOCUMENTS

| | | |
|---|---|---|
| EP | 0302454 A2 | 2/1989 |
| JP | 03082273 A | 4/1991 |

(Continued)

OTHER PUBLICATIONS

Strickland, Robin N., Cheol-Sung Kim, and William F. McDonnell. "Digital color image enhancement based on the saturation component." Optical Engineering 26.7 (1987): 267609-267609.*

*Primary Examiner* — Kim Vu
*Assistant Examiner* — Nathan Bloom
(74) *Attorney, Agent, or Firm* — Shimokaji IP

(57) ABSTRACT

A color image is enhanced in the following fashion. A saturation detector (SDT) detects a degree of color saturation (LC, CC) that occurs in an image area (SP). A filter arrangement (DE1, DE2, DE3) filters at least one spatial detail in the image area to a degree that depends on the degree of color saturation. This allows an improvement of perceptual quality of color images.

19 Claims, 4 Drawing Sheets

(56) References Cited

U.S. PATENT DOCUMENTS

| | | | |
|---|---|---|---|
| 8,243,104 B2* | 8/2012 | Someya et al. | 345/690 |
| 8,570,341 B1* | 10/2013 | Xie | 345/600 |
| 2002/0114513 A1 | 8/2002 | Hirao | |
| 2002/0176105 A1 | 11/2002 | Kawai et al. | |
| 2004/0240726 A1* | 12/2004 | Stavely et al. | 382/162 |
| 2005/0099545 A1* | 5/2005 | Zhu | 348/630 |
| 2005/0110906 A1* | 5/2005 | Lee et al. | 348/673 |
| 2005/0175236 A1* | 8/2005 | Piepers | 382/162 |
| 2005/0249430 A1 | 11/2005 | Lim | |
| 2006/0055985 A1* | 3/2006 | Ikeda | 358/463 |
| 2006/0238655 A1 | 10/2006 | Chou | |
| 2007/0080975 A1* | 4/2007 | Yamashita et al. | 345/591 |
| 2007/0109423 A1 | 5/2007 | Kohashi et al. | |

FOREIGN PATENT DOCUMENTS

| | | |
|---|---|---|
| JP | H1040373 | 2/1998 |
| JP | 2002245446 | 8/2002 |

* cited by examiner

```
void Colour_Detail_Boost(BYTE *buf_inp,BYTE *buf_outp,BYTE *buf_uv,BYTE *buf_uvo){
  int px,ln;
  int Ap=4,Av,Avu,Avv,norm,count;
  float gainCDB;

norm=((2*Ap+1)*(2*Ap+1));
  for (ln = Ap;ln < H-Ap;ln++)
    for (px = Ap;px < W-Ap;px++){
      Av=0;
      for(int y=-Ap;y<=Ap;y++)
        for(int x=-Ap;x<=Ap;x++)
          Av+=(int)buf_inp[(ln+y)*W + px+x];
      Av=(Av+norm/2)/norm;
      gainCDB=1.0+((float)abs((int)buf_uv[ln*W + px]-128)+(float)abs((int)buf_uv[ln*W + px+1]-128))/128.0;
      buf_outp[ln*W + px] = (BYTE) clip(gainCDB*((int)buf_inp[ln*W + px]-Av)+Av,0,255);
    } for (ln = 4;ln < H-5;ln++)
    for (px = 4;px < W-4;px+=2){
      Avu=0;Avv=0;count=0;
      for(int y=-Ap;y<=Ap;y++)
        for(int x=-Ap;x<=Ap;x+=2){
          Avu+=(int)buf_uv[(ln+y)*W + px+x];
          Avv+=(int)buf_uv[(ln+y)*W + px+x+1];
          count++;
        }
      Avu=(Avu+count/2)/count; Avv=(Avv+count/2)/count;
      gainCDB=1.0+((float)abs((int)buf_uv[ln*W + px]-128)+(float)abs((int)buf_uv[ln*W + px+1]-128))/64.0;
      buf_uvo[ln*W + px]   = (BYTE) clip(gainCDB*((int)buf_uv[ln*W + px]-Avu)+Avu,0,255);
      buf_uvo[ln*W + px+1] = (BYTE) clip(gainCDB*((int)buf_uv[ln*W + px+1]-Avv)+Avv,0,255);
    }
}
```

CP1 ≈ SQ
CP2 ≈ PSR, TVC
CP3 ≈ SDT
CP4 ≈ SU, MUL, AD2, CLP

FIG. 6

COLOR IMAGE ENHANCEMENT

FIELD OF THE INVENTION

An aspect of the invention relates to a method of image enhancement that can improve perceptual quality of color images. Other aspects of the invention relate to an image enhancer, an image rendering system, and a computer program product for a programmable processor.

BACKGROUND OF THE INVENTION

Color information is usually represented with a lower resolution than luminance information. For example, so-called chromatic sampling may have been applied to a color image in accordance with a particular scheme, such as, for example, a 4:1:1 or a 4:2:2 sub-sampling scheme. Several pixels, which are neighbors of each other, share a same chrominance component, whereas each of these pixels has a unique luminance component. This does generally not affect perceived image quality. A typical human observer will generally regard an image where chrominance information has a somewhat lower resolution than luminance information, as being equivalent to a similar image wherein the chrominance information has the same resolution as the luminance information.

U.S. Pat. No. 5,982,926 describes that various image enhancement processes have been developed for improving the perceived clarity, intelligibility, and/or quality of images. These image enhancement processes attempt to render images more pleasing to human eyes, irrespective of whether or not these images are accurately reproduced. Oftentimes, a distorted image is more pleasing to the human eye than a perfectly reproduced copy of the original image. For example, if overshoot or undershoot is incorporated into the edges of an image, the resulting image is typically perceived as being more pleasing than an image without such undershoot or overshoot.

SUMMARY OF THE INVENTION

There is a need for improving perceptual quality of color images. The following points have been taken into consideration in order to better address this need.

It has been observed that a color image may appear a bit blurred in an area wherein relatively high degree of color saturation occurs. The color image appears particularly blurred in case the area concerned comprises relatively many details. Moreover, the area concerned may appear to be lacking color saturation. These phenomena particularly occur in images where color information is represented with a lower resolution than luminance information. Such a seemingly local loss of resolution, or local loss of saturation, or both, affects the perceptual quality of the color image concerned.

In accordance with an aspect of the invention, a color image is enhanced in the following fashion. A saturation detector detects a degree of color saturation that occurs in an image area. A filter arrangement filters at least one spatial detail in the image area to a degree that depends on the degree of color saturation.

Accordingly, spatial details may be emphasized to a relatively high degree in an image area wherein relatively a high degree of color saturation occurs. Conversely, spatial details may be emphasized to a relatively modest degree, or are even left unaltered, in an image area where color saturation is relatively low. Such emphasizing of details as a function of color saturation compensates for a seemingly loss of resolution, or a seemingly loss of saturation, or both, in the image area concerned. This allows color images to have a better perceptual quality. Experiments have confirmed this. Various different color images have been enhanced in accordance with the invention. Various observers have compared each of these color images with its enhanced version. The enhanced version was clearly perceived as better.

An implementation of the invention advantageously comprises one or more of the following additional features, which are described in separate paragraphs that correspond with individual dependent claims.

The filter arrangement preferably amplifies a difference in value between a pixel of interest and neighboring pixels in the image area to a degree that is greater as the degree of color saturation is higher. This allows low-cost implementations.

The difference in value that is amplified may comprise a luminance value.

The difference in value that is amplified may comprise a chrominance value.

The difference in value that is amplified preferably comprises a luminance value and a chrominance value. This contributes to achieving a relatively high perceptual quality.

The degree to which a difference in chrominance value is amplified is preferably greater than the degree to which a difference in luminance value is amplified. This contributes to achieving a relatively high perceptual quality.

The degree of color saturation that is detected is preferably that of the pixel of interest. This allows low-cost implementations.

The saturation detector preferably determines an absolute difference between a chrominance value that belongs to the pixel of interest and a central value, which corresponds with an insignificant degree of saturation. A control value may be generated on the basis of the absolute difference, the control value determining the degree to which the difference in value between the pixel of interest and the neighboring pixels is amplified. This allows low-cost implementations.

The filter arrangement preferably determines a typical value of the neighboring pixels. The typical value may than be subtracted from a value that belongs to the pixel of interest, so as to obtain a difference value. The difference value is multiplied by a factor that is higher as the degree of color saturation is higher, so as to obtain an amplified difference value. The typical value is then added to the amplified difference value, so as to obtain a modified value for the pixel of interest. This allows low-cost implementations.

A sequencer may successively designate respective pixels in a color image, one by one, as the pixel of interest.

The aforementioned difference in value is preferably established on the basis of a set of pixels that is formed on the basis of a predefined aperture, which includes the pixel of interest.

A detailed description, with reference to drawings, illustrates the invention summarized hereinbefore as well as the additional features.

BRIEF DESCRIPTION OF THE DRAWINGS

FIG. 6 is a computer code diagram that illustrates a software implementation of the image enhancer.

DETAILED DESCRIPTION

Figure 1:
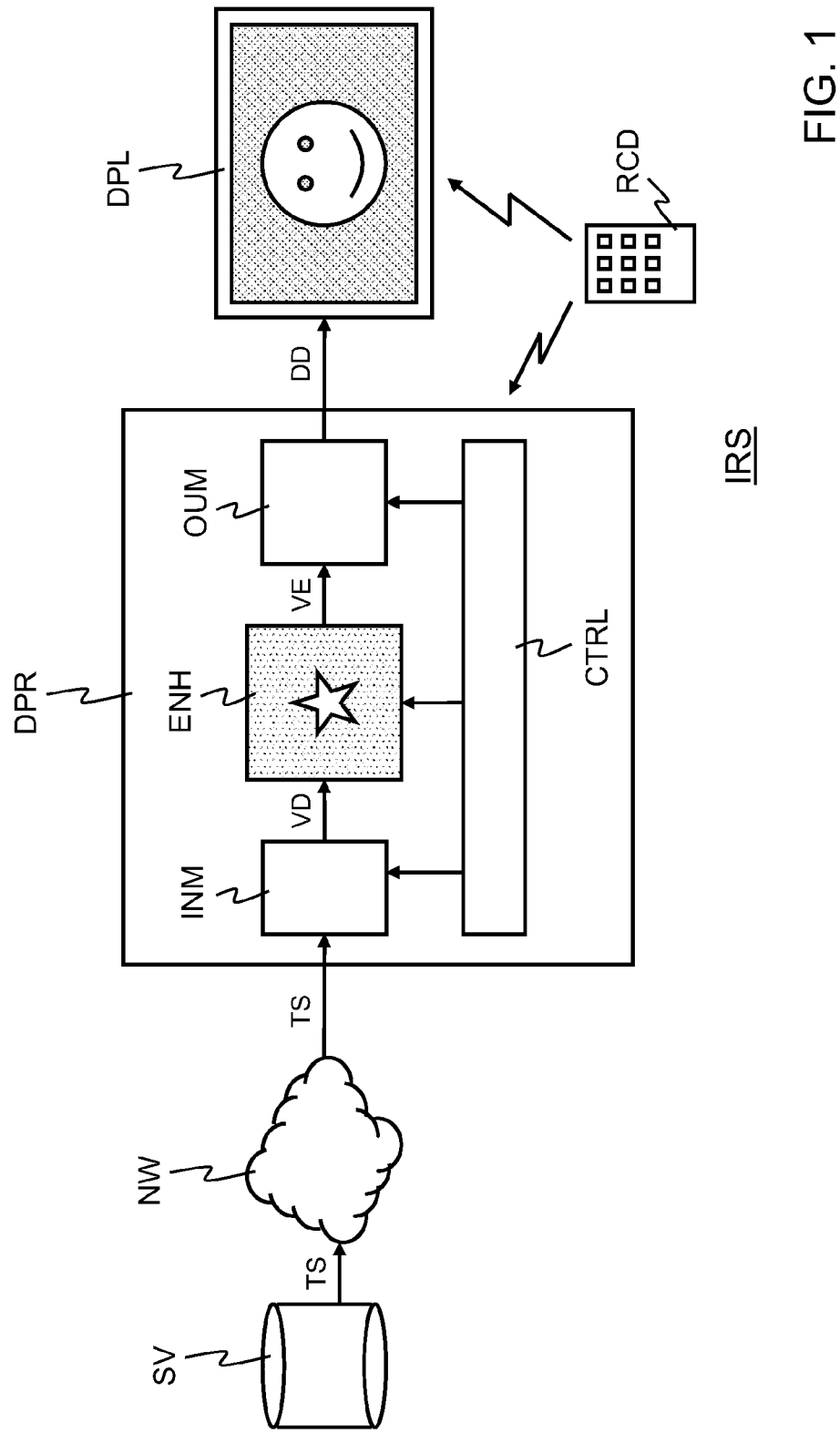
FIG. 1 is a block diagram that illustrates an image rendering system.

FIG. 1 illustrates an image rendering system IRS that is coupled to a network NW, which may be, for example, a cable television network or the Internet. A visual data server SV is also coupled to the network NW. The image rendering system IRS comprises a data processing device DPR, a display device DPL, and a remote-control device RCD. The data processing device DPR may be in the form of, for example, a personal computer or a so-called settop box. The data processing device DPR and the display device DPL may jointly form part of a television set. The data processing device DPR comprises an input module INM, an image enhancer ENH, an output module OUM, and a controller CTRL.

The image rendering system IRS basically operates as follows. A user may select a particular visual item that is present on the visual data server SV by means of the remote-control device RCD. The data processing device DPR submits a request, which indicates this selected visual item, to the visual data server SV. In response, the visual data server SV provides a transport stream TS that conveys the selected visual item. The selected visual item may be, for example, a video title or a still picture. The transport stream TS may be, for example, in accordance with a JPEG or MPEG encoding standard (JPEG is an acronym for Joint Photographic Experts Group; MPEG is an acronym for Moving Picture Experts Group). The data processing device DPR receives the transport stream TS via the network NW.

The input module INM of the data processing device DPR extracts from the transport stream TS, visual data VD that represents the selected visual item. As mentioned hereinbefore, the selected visual item may be a video title, which comprises a sequence of color images, or a still picture, which comprises a single color image. In any case, the image enhancer ENH enhances the color images comprised in the visual data VD so as to obtain enhanced visual data VE. The output module OUM provides a display driver signal DD on the basis of the enhanced visual data VE. The display driver signal DD causes the display device DPL to display the selected visual item. It is desirable that the user perceives the color images, as displayed by the display device DPL, as being of relatively good quality. The image enhancer ENH makes that the perceived image quality is better than that which would be obtained if the image enhancer ENH was not present in the image rendering system IRS.

Figure 2:
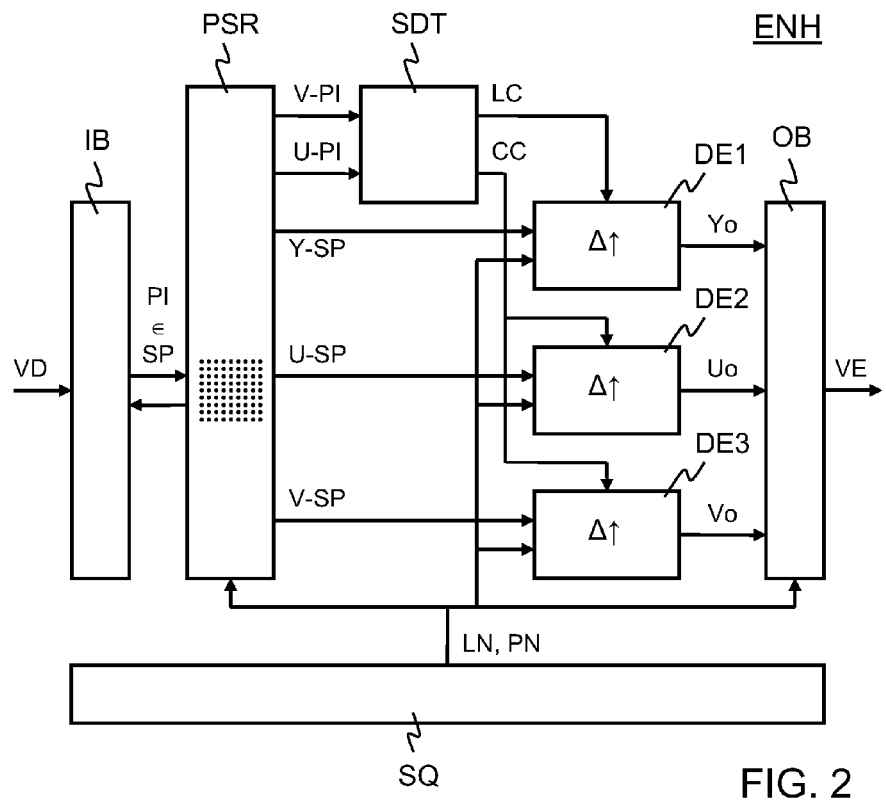
FIG. 2 is a block diagram that illustrates an image enhancer, which forms part of the image rendering system.

FIG. 2 illustrates the image enhancer ENH, which forms part of the data processing device DPR. The image enhancer ENH comprises various functional entities: an input buffer IB, a pixel selector and router PSR, a saturation detector SDT, three detail emphasis modules DE1, DE2, DE3, and an output buffer OB. The aforementioned functional entities constitute an image data processing path. The three detail emphasis modules DE1, DE2, DE3 constitute a high-pass filter arrangement for color images. The image enhancer ENH further comprises a sequencer SQ, which may be regarded as a controller dedicated to the image data processing path.

The image enhancer ENH may be implemented by means of a software program, that is, a set of instructions, which is loaded into a programmable processor. In such a software-based implementation, the software program causes the programmable processor to carry out various operations described hereinafter with reference to FIG. 2. FIG. 2 can thus be regarded to represent a method, whereby a functional entity, or a group of functional entities, can be considered as a processing step, or a series of processing steps, of this method. For example, the saturation detector SDT can represent a saturation detection step.

The image enhancer ENH may also be implemented by means of a dedicated circuit, which has a particular topology defining operations described hereinafter with reference to FIG. 2. In such a hardware implementation, a functional entity illustrated in FIG. 2 may correspond with a sub-circuit. FIG. 2 can thus equally be regarded to represent a circuit diagram at a block level. An implementation of the image enhancer ENH may also be hybrid in the sense that it comprises at least one dedicated circuit and at least one programmable circuit with a suitable set of instructions.

The image enhancer ENH basically operates as follows. The input buffer IB temporarily stores the visual data VD, which the input module INM illustrated in FIG. 1 provides. Accordingly, at a given instant, the input buffer IB may comprise a color image, which is comprised in the visual data VD. The color image can be regarded as a matrix of pixels. The color image may be, for example, in the so-called YUV color format. In this format, a pixel has a luminance component, which uniquely belongs to the pixel concerned. A pixel may further have a chrominance component pair comprising a first chrominance component and a second chrominance component. Several neighboring pixels may share the same chrominance component pair. In that case, the chrominance components have been sub-sampled with respect to the luminance components. This is the case, for example, in the so-called 4:2 2 sub-sampling scheme, wherein chrominance components have a horizontal resolution that is half of that of the luminance components.

The sequencer SQ provides pixel selection data LN, PN that designates a particular pixel in the color image. The pixel selection data LN, PN may comprise for example, a line number LN and a pixel number PN. The particular pixel that is designated will be referred to as pixel of interest PI hereinafter. The sequencer SQ updates the pixel selection data LN, PN so that all pixels in the color image, except for those in a boundary region, successively constitute the pixel of interest PI. That is, the sequencer SQ scans, as it were, the color image pixel by pixel, except for pixels that are present in the boundary region.

The pixel selector and router PSR reads a set of pixels SP from the input buffer IB on the basis of the pixel selection data LN, PN. The set of pixels SP includes the pixel of interest PI and various neighboring pixels. In effect, the pixel selector and router PSR defines an aperture, which determines the neighboring pixels that form part of the set of pixels SP. The aperture can be regarded as a window, which the sequencer SQ causes to slide over the color image. The pixel of interest PI will typically be at the center of this window, but not necessarily. In a manner of speaking, the window slides over the color image until it hits a boundary of the color image. The aforementioned boundary region, from which pixels need not be selected, thus depends on the aperture. The aperture may appropriately be adapted at boundaries of the color image. In that case, all pixels of the color image may successively be selected.

Figure 3:
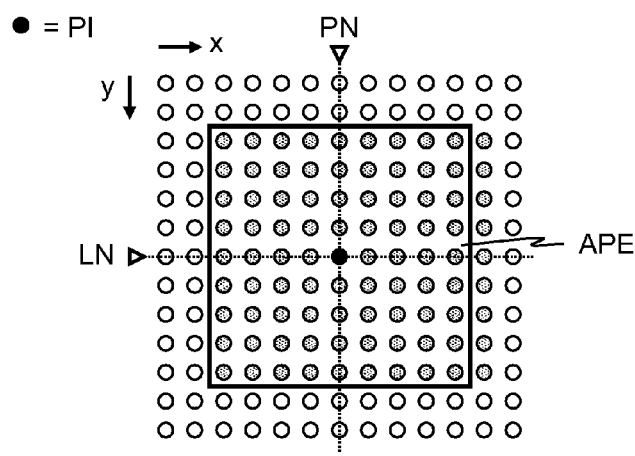
FIG. 3 is a pictorial diagram that illustrates a designation of a pixel of interest and an aperture for defining a set of pixels, which includes the pixel of interest.

FIG. 3 illustrates an example of a rectangular aperture APE, which the pixel selector and router PSR may define. Pixels are represented by means of relatively small circles. The pixels are arranged in columns and in rows, along a horizontal axis x and a vertical axis y, respectively. The pixel selection data LN, PN from the sequencer SQ may define a line number LN and a pixel number PN, which are represented by dotted lines and relatively small rectangles that point downward and rightward, respectively. The pixel that constitutes the pixel of interest PI has a black filling. The other pixels within the rectangular aperture APE have a gray filling. These pixels, as well as the pixel of interest PI, constitute the set of pixels SP that the pixel selector and router PSR constitutes on the basis of the pixel selection data LN, PN.

The saturation detector SDT receives a chrominance component pair V-PI, U-PI from the pixel selector and router PSR. The chrominance component pair V-PI, U-PI belongs to the pixel of interest PI. The saturation detector SDT establishes a luminance control value LC and a chrominance control value CC on the basis of the chrominance component pair V-PI, U-PI. The luminance control value LC determines a degree of spatial detail emphasis, which applies to the luminance component of the pixel of interest PI. Similarly, the chrominance control value CC determines a degree of spatial detail emphasis, which applies to the chrominance component pair of the pixel of interest PI. Preferably, the degree of spatial detail emphasis is relatively high if the pixel of interest PI exhibits a relatively high degree of color saturation. The luminance control value LC and the chrominance control value CC reflect a degree of color saturation, which can be derived from the chrominance component pair V-PI, U-PI of the pixel of interest. This will be described in greater detail hereinafter.

Detail emphasis module DE1 receives a set of luminance components Y-SP from the pixel selector and router PSR. The set of luminance components Y-SP comprises respective luminance components that belong to the set of pixels SP, which the pixel selector and router PSR has formed. The set of luminance components Y-SP thus comprises the luminance component of the pixel of interest PI. This luminance component will be referred to as luminance component of interest hereinafter. The set of luminance components Y-SP further comprises respective luminance components of respective neighboring pixels, which are also in the set of pixels SP that the pixel selector and router PSR has formed. These latter luminance components will be referred to as neighboring luminance components hereinafter. Detail emphasis module DE1 further receives the luminance control value LC, which the saturation detector SDT has established.

Detail emphasis module DE1 provides an output luminance component Yo for an enhanced color image, which is formed in the output buffer OB. The output luminance component Yo is assigned to a particular pixel of the enhanced color image. This particular pixel has a position similar to that of the pixel of interest PI in the color image, in terms of line number LN and pixel number PN. The output luminance component Yo can be regarded as a modified version of the luminance component of interest. More specifically, the luminance component of interest has a given value, which may be modified by detail emphasis module DE1. This luminance value modification depends on the value of the luminance component of interest with respect to the respective values of the respective neighboring luminance components. Importantly, the luminance value modification further depends on the luminance control value LC, which reflects the degree of color saturation.

For example, let it be assumed that the luminance component of interest has a relatively low value compared with those of the neighboring luminance components. In that case, detail emphasis module DE1 further decreases the value of the luminance component of interest. Conversely, in case the luminance component of interest has relatively high value, detail emphasis module DE1 further increases the value of the luminance component of interest. In both cases, a difference in value between the luminance component of interest and the neighboring luminance components is amplified.

The difference in value that is amplified may be expressed in numerous different ways. For example, the difference may be the difference between the value of the luminance component of interest and the average value of the neighboring luminance components. As another example, the median value of the neighboring luminance components may be used for expressing the difference. The luminance component of interest may also be included to establish the average or median value. What matters is that the difference represents a spatial detail that is amplified to degree that depends on the luminance control value LC, which reflects the degree of saturation. The higher the degree of saturation is, the higher the degree of amplification that the difference undergoes.

Detail emphasis modules DE2, DE3 operate in a fashion similar. Detail emphasis modules DE2, DE3 receive a set of first chrominance components U-SP and a set of second chrominance components V-SP, respectively, from the pixel selector and router PSR. The set of first chrominance components U-SP comprises a first chrominance component of interest, which is the first chrominance component of the pixel of interest PI, and neighboring first chrominance components. Similarly, the set of second chrominance components V-SP comprises a second chrominance of interest, as well as neighboring second chrominance components. In each case, the chrominance components that the detail emphasis modules DE2, DE3 receive are those belonging to the set of pixels SP, which the pixel selector and router PSR has formed.

A difference is that detail emphasis modules DE2, DE3 receive the chrominance control value CC, whereas the luminance control value LC was applied to detail emphasis module DE1. This difference is preferable but not fundamental. Applying different control values allows different degrees of detail amplification for luminance and chrominance, which may contribute to increasing perceptual image quality. In any case, detail emphasis module DE2 amplifies a difference in value between the first chrominance component of interest and the neighboring first chrominance components to a degree that depends on the degree of color saturation, which the chrominance control value CC reflects. Detail emphasis module DE3 amplifies a difference in value between the second chrominance component of interest and the neighboring second chrominance components to a similar degree.

Detail emphasis modules DE2, DE3 provide a first output chrominance component Uo and a second output chrominance component Vo, respectively, for the enhanced color image, which is formed in the output buffer OB. This output chrominance components pair Uo, Vo is assigned to the same pixel for which detail emphasis module DE1 established the output luminance component Yo as described hereinbefore. That is, the first output chrominance component Uo and the second output chrominance component Vo can be regarded as a modified version of the first chrominance component of interest and the second chrominance component of interest, respectively.

The sequencer SQ causes all luminance components and all chrominance components of the color image in the input buffer IB to undergo detail amplification, which is color saturation dependent as described hereinbefore, except for components that are in the boundary region. The latter components may be simply mapped, as it were, from the color image to the enhanced color image in the output buffer OB. Alternatively, these components may undergo adapted detail amplification, or another type of suitable processing.

It should be noted that detail emphasis modules DE2, DE3 may operate at a lower rate than detail emphasis module DE1. This is because the color image, which is present in the input buffer IB, comprises less chrominance component pairs than luminance components. As mentioned hereinbefore, several pixels, which are neighbors of each other, may share the same pair of chrominance components, whereas each of these pixels has a unique luminance component. Consequently, it is sufficient that detail emphasis modules DE2, DE3 process the pair of chrominance components concerned for one of these pixels only. This will produce an output chrominance component pair Uo, Vo, which applies to each of these pixels. In contrast, detail emphasis module DE1 will need to individually process the respective luminance components of the respective pixels concerned.

Once all relevant components of the input image have been processed, the output buffer OB will comprise the enhanced color image in its entirety. The enhanced color image is included in the enhanced visual data VE that the image enhancer ENH applies to the output module OUM, as illustrated in FIG. 1.

Figure 4:
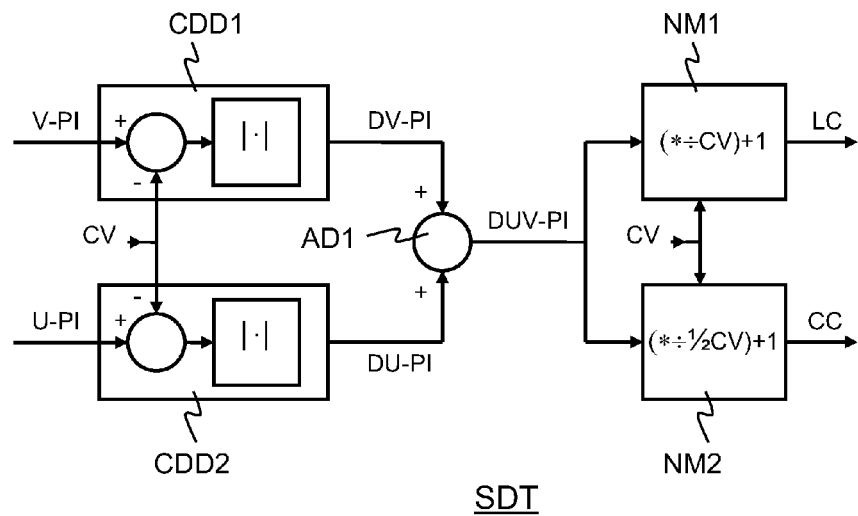
FIG. 4 is a block diagram that illustrates a saturation detector, which forms part of the image enhancer.

FIG. 4 illustrates the saturation detector SDT or, rather, an example thereof. The saturation detector SDT receives the chrominance component pair V-PI, U-PI, which comprises a first chrominance component of interest V-PI and a second chrominance component of interest U-PI. The saturation detector SDT comprises various functional entities: two center deviation detectors CDD1, CDD2, an adder AD1, and two normalizers NM1, NM2. The remarks made hereinbefore with regard to various possible implementations of the image enhancer ENH, which may be software-based or hardware-based, equally apply to the saturation detector SDT. FIG. 4 can thus be regarded to represent a method, whereby a functional entity, or a group of functional entities, can be considered as a processing step, or a series of processing steps, of this method.

Center deviation detector CDD1 establishes an absolute difference between the value of the first chrominance component of interest V-PI and a central value CV. The central value CV corresponds with an insignificant degree of saturation, that is, the central value CV is tantamount to no saturation at all. For example, let it be assumed that chrominance components have values that are comprised in a range between 0 and 255, which is typically the case if those values are expressed by means of 8 bits. In that case, the central value CV may be, for example, 128. Center deviation detector CDD1 may subtract the central value CV from the value of the first chrominance component of interest V-PI and take the absolute value of the result of the subtraction, so as to obtain the absolute difference between the aforementioned values. The center deviation detector CDD1 provides a first chrominance deviation value DV-PI, which corresponds with this absolute difference. In a similar fashion, center deviation detector CDD2 provides a second chrominance deviation value DU-PI, which corresponds with an absolute difference between the value of the second chrominance component of interest U-PI and the central value CV.

Adder AD1 adds the first chrominance deviation value DV-PI to the second chrominance deviation value DU-PI, which produces an overall chrominance deviation value DUV-PI. The overall chrominance deviation value DUV-PI represents a degree of saturation for the pixel of interest PI. The higher the overall chrominance deviation value DUV-PI is, the higher the degree of saturation is. Conversely, in case the pixel of interest PI exhibits a relatively low degree of saturation, the overall chrominance deviation value DUV-PI will be relatively close to zero (0).

Normalizer NM1 divides the overall chrominance deviation value DUV-PI by the central value CV. In addition, normalizer NM1 adds one unit of value (1) to the result of this division so as to obtain the luminance control value LC. The luminance control value LC may therefore be comprised in a range between 1 and 2. The luminance control value LC will be relatively close to 1 if the pixel of interest PI exhibits a relatively low degree of saturation and will be relatively close to 2 if the pixel of interest PI exhibits a relatively high degree of saturation.

Normalizer NM2 divides the overall chrominance deviation value DUV-PI by half the central value CV. In addition, normalizer NM2 adds one unit of value (1) to the result of this division so as to obtain the luminance control value LC. The chrominance control value CC may therefore be comprised in a range between 1 and 3. That is, the chrominance control value CC may vary over a wider range than the luminance control value LC. The chrominance control value CC will be relatively close to 3 if the pixel of interest PI exhibits a relatively high degree of saturation. As a result, the degree of detail amplification will be higher for chrominance components than for luminance components.

Figure 5:
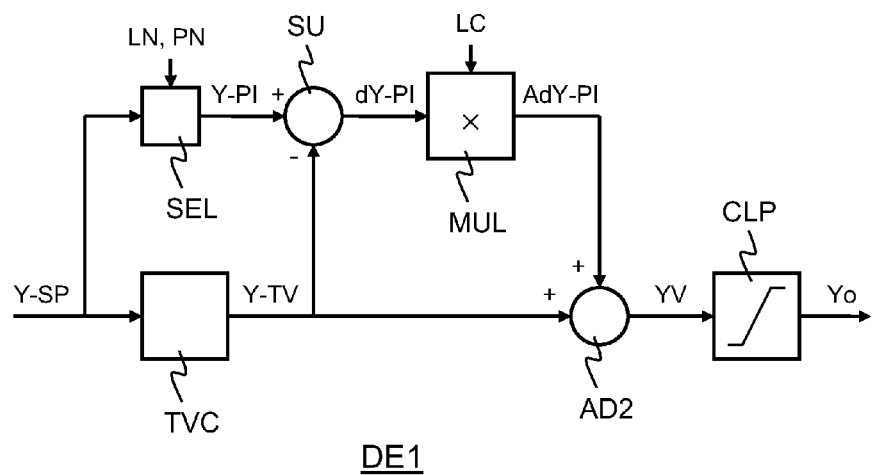
FIG. 5 is a block diagram that illustrates a detail emphasis module, which forms part of the image enhancer.

FIG. 5 illustrates detail emphasis module DE1 or, rather, an example thereof Detail emphasis module DE1 comprises various functional entities: a selector SEL, a typical value calculator TVC, a subtractor SU, a multiplier MUL, an adder AD2, and a clipper CLP. The remarks made hereinbefore with regard to various possible implementations of the image enhancer ENH, which may be software-based or hardware-based, equally apply to the saturation detector SDT. FIG. 5 can thus be regarded to represent a method, whereby a functional entity, or a group of functional entities, can be considered as a processing step, or a series of processing steps, of this method.

The selector SEL selects a luminance component of interest Y-PI, which is in the set of luminance components Y-SP. As mentioned hereinbefore, the pixel selection data LN, PN identifies the pixel of interest PI and, therefore, the luminance component of interest Y-PI. The typical value calculator TVC calculates a typical luminance value Y-TV on the basis of the set of luminance components Y-SP. The typical luminance value Y-TV may be, for example, an average of the respective values of the neighboring luminance components, which are comprised in the set. As another example, the typical luminance value Y-TV may be a median value.

The subtractor SU subtracts the typical luminance value Y-TV from the value of the luminance component of interest Y-PI. Accordingly, the subtractor SU provides a luminance difference value dY-PI for the pixel of interest PI, which expresses the difference in value between the luminance component of interest Y-PI and the neighboring luminance components.

The multiplier MUL multiplies the luminance difference value dY-PI with the luminance control value LC, which the saturation detector SDT illustrated in FIG. 4 provides. The result of this multiplication is an amplified luminance difference value AdY-PI. The luminance control value LC constitutes an amplification factor, that is, a gain value for the difference in value between the luminance component of interest Y-PI and the neighboring luminance components. The adder AD2 adds the typical luminance value Y-TV to the amplified luminance difference value AdY-PI so as to obtain an unbounded output luminance value YV.

The clipper CLP assigns a value to the output luminance component Yo on the basis of the unbounded output luminance value YV. In case the unbounded output luminance value YV is in a desired range, the value of the output luminance component Yo is equal to the unbounded output luminance value YV. The desired range may be comprised between, for example, 0 and 255, which represent a lower limit and an upper limit, respectively. In case the unbounded output luminance value YV is below the lower limit, the value of the output luminance component Yo is equal to the lower limit. Conversely, in case the unbounded output luminance value YV is above the upper limit, the value of the output luminance component Yo is equal to the upper limit. The clipper CLP thus ensures that is the value of the output luminance component Yo is within the desired range.

Let it be assumed that the pixel of interest PI exhibits an insignificant degree of color saturation. As a result, the luminance control value LC will be equal to 1, or only slightly greater than 1. In that case, the difference in value between the luminance component of interest Y-PI and the neighboring luminance components is not amplified, or only to an insignificant degree. The gain value is 1, or only slightly greater than 1. The output luminance component Yo will be substantially equal to the luminance component of interest Y-PI. There is no emphasis of any details because there is an insignificant degree of color saturation.

Conversely, let it now be assumed that the pixel of interest PI exhibits a relatively high degree of color saturation. As a result, the luminance control value LC will be significantly greater than 1. In that case, the difference in value between the luminance component of interest Y-PI and the neighboring luminance components is amplified to a degree that depends on the degree of color saturation. The gain value is significantly greater than 1. In case the value of the luminance component of interest Y-PI is relatively low with respect to those of the neighboring luminance components, the value of the output luminance component Yo will be even lower than that of the luminance component of interest Y-PI. Conversely, in case the value of the luminance component of interest Y-PI is relatively high with respect to those of the neighboring luminance components, the value of the output luminance component Yo will be even higher than that of the luminance component of interest Y-PI. The higher the degree of color saturation is, the higher the degree to which the value of the luminance component of interest Y-PI is effectively decreased or increased, respectively. Accordingly, spatial luminance details are boosted in a region where color saturation is high.

Detail emphasis modules DE2, DE3 are similar to detail emphasis module DE1 illustrated in FIG. 5 and operate in a similar fashion. A difference is that detail emphasis module DE2 will comprise a multiplier comparable with the multiplier MUL illustrated in FIG. 5, which receives the chrominance control value CC instead of the luminance control value LC. The same applies to detail emphasis module DE3. Since the chrominance control value CC has a higher upper limit, namely 3, than that of the luminance control value LC, which is 2, spatial chrominance details are boosted to an even greater extent than spatial luminance details in a region where color saturation is high.

FIG. 6 illustrates a software-based implementation of the image enhancer ENH illustrated in FIG. 2. FIG. 6 is a computer code diagram that illustrates a set of instructions written in c-code, which can cause a processor to carry out operations described hereinbefore in connection with FIG. 2, as well as those described in connection with FIGS. 3-5. The set of instructions comprises respective code portions CP1-CP4 that are related to respective functional entities illustrated in the aforementioned figures and described hereinbefore. FIG. 6 indicates these relationships by means of reference signs: a code portion that corresponds with a functional entity illustrated in any of the FIGS. 2-5, is provided with a reference sign corresponding to that of the functional entity concerned.

CONCLUDING REMARKS

The detailed description hereinbefore with reference to the drawings is merely an illustration of the invention and the additional features, which are defined in the claims. The invention can be implemented in numerous different ways. In order to illustrate this, some alternatives are briefly indicated.

The invention may be applied to advantage in numerous types of products or methods that involve color images. For example, the invention may be applied in a portable communication apparatus that is provided with a color display, such as, for example, a cellular phone or a personal digital assistant (PDA). Color images, which are to be enhanced, may be received in numerous different fashions. FIG. 2 illustrates an example in which color images are received from a server via a network. In other applications, color images may be received from a reading module that reads a data carrier, such as, for example, an optical disk, a hard disk, or a solid-state memory. Such a reading module may form part of an image rendering apparatus in which the invention is applied. A color image, which is enhanced in accordance with the invention, need not necessarily be in a particular format. The detailed description provides an example in which a color image is in the so-called YUV format. As other examples, a color image in the so-called YCrCb format or in the so-called HSV format may also be enhanced in accordance with the invention.

There are various manners of filtering a spatial detail in an image area to a degree that depends on the degree of color saturation. The detailed description provides an example in which a spatial detail in an image area is emphasized to a degree that is greater as the degree of color saturation is higher. Emphasizing a spatial detail is tantamount to high-pass filtering. As another example, a spatial detail may undergo a low-pass filtering to a degree that is greater as the degree of color saturation is higher. That is, the spatial detail is deemphasized to degree that is greater as the degree of color saturation is higher. Such a filtering technique may be advantageous for processing, for example, a video signal obtained by reading a videocassette of the VHS type. On such a videocassette, color information is stored by means of a modulation technique that causes relatively strong noise in saturated color planes. This noise can be reduced by applying a degree of low-pass filtering that is greater as the degree of color saturation in the plane concerned is greater. Perceptual image quality will improve. This may also be obtained by applying a degree of high-pass filtering that is greater as the degree of color saturation in the plane concerned is lower. In such an application, details are emphasized only in image areas where color saturation is relatively low, which avoids an emphasis of color noise that would otherwise adversely affect perceptual image quality.

There are numerous ways of filtering spatial details in image. The detailed description provides an example in which a difference in value between a pixel of interest and neighboring pixels is amplified on a pixel by pixel basis. As another example, a filter arrangement may detect particular sets of pixels that represent details, such as, for example, a set of pixels around a border of an object. The filter arrangement may then amplify high-frequency components that are present in such a set of pixels. For example, high-pass filtering may selectively be applied to areas in image that comprise relatively many details and in which colors are saturated to relatively high degree. Frequency analysis techniques may be used to identify areas that comprise relatively many details.

There are numerous ways of detecting the degree of color saturation. The detailed description provides an example in which an absolute difference is determined between a chrominance value that belongs to a pixel of interest and a central value. As another example, respective chrominance values of respective pixels in a particular image area may be analyzed so as to determine a degree of color saturation. A pair of chrominance values may be expressed in the form of a vector, which has a given length. The degree of saturation may be derived from the length of such a vector. There are numerous ways of generating a control value, which reflects the degree of color saturation, on the basis of one or more chrominance values. First of all, a suitable way of generating a control value will depend on the color format of the color image. Furthermore, a control value may vary with the degree of saturation in a nonlinear fashion. The degree of detail emphasis need not necessarily be proportional with the degree of saturation.

The term "image" should be understood in a broad sense. The term includes any element that can be visually rendered, such as, for example, a picture, a frame, or a field. The term "filtering" should be understood in a broad sense. This term includes any type of processing by means of which one property of a pixel of interest, or a group of pixels of interest, is modified in dependence on other pixels that have neighboring positions, either spatially or temporally, or both.

In broad terms, there are numerous ways of implementing functional entities by means of hardware or software, or a combination of both. In this respect, the drawings are very diagrammatic. Although a drawing shows different functional entities as different blocks, this by no means excludes implementations in which a single entity carries out several functions, or in which several entities carry out a single function. For example, referring to FIG. 2, detail emphasis modules DE2, DE3 may be implemented by means of a single software module.

There are numerous ways of storing and distributing a set of instructions, that is, software, which allows a programmable circuit to operate in accordance with the invention. For example, software may be stored in a suitable medium, such as an optical disk or a memory circuit. A medium in which software stored may be supplied as an individual product or together with another product, which may execute software. Such a medium may also be part of a product that enables software to be executed. Software may also be distributed via communication networks, which may be wired, wireless, or hybrid. For example, software may be distributed via the Internet. Software may be made available for download by means of a server. Downloading may be subject to a payment.

The remarks made herein before demonstrate that the detailed description, with reference to the drawings, illustrates rather than limits the invention. There are numerous alternatives, which fall within the scope of the appended claims. Any reference sign in a claim should not be construed as limiting the claim. The word "comprising" does not exclude the presence of other elements or steps than those listed in a claim. The word "a" or "an" preceding an element or step does not exclude the presence of a plurality of such elements or steps. The mere fact that respective dependent claims define respective additional features, does not exclude a combination of additional features, which corresponds to a combination of dependent claims.

The invention claimed is:

1. A method of image enhancement, comprising:
   detecting a degree of color saturation in an image area; and
   filtering at least one spatial detail in the image area by:
      determining a first luminance value corresponding to a pixel of interest in the image area;
      determining a second luminance value corresponding to one or more neighboring pixels neighboring the pixel of interest;
      obtaining a difference in luminance value between the first luminance value and the second luminance value; and
      amplifying the difference in luminance value by a factor that increases as the degree of color saturation increases.

2. A method according to claim 1, further comprising:
   determining a first a chrominance value corresponding to the pixel of interest in the image area;
   determining a second chrominance value corresponding to the one or more neighboring pixels neighboring the pixel of interest; and
   obtaining a difference in chrominance value between the first chrominance value and the second chrominance value.

3. A method according to claim 2, wherein the difference in chrominance value is amplified.

4. A method according to claim 3, wherein, in the filtering step, the factor to which a difference in chrominance value is amplified is greater than the factor to which a difference in luminance value is amplified.

5. A method according to claim 1, wherein, the degree of color saturation that is detected is that of the pixel of interest.

6. A method according to claim 5, further comprising:
   a center deviation detection sub-step in which an absolute difference is determined between a chrominance value that belongs to the pixel of interest and a central value, which corresponds with an insignificant degree of saturation; and
   a control value generation sub-step in which a control value is generated on the basis of the absolute difference, the control value determining the degree to which the difference in value between the pixel of interest and the neighboring pixels is amplified.

7. A method according to claim 1, wherein the filtering step further comprises:
   a typical value calculation sub-step in which a typical value of the neighboring pixels is determined;
   a subtraction sub-step in which the typical value is subtracted from a value that belongs to the pixel of interest, so as to obtain the difference in value as being a difference in value between the pixel of interest and the typical value;
   a multiplication sub-step in which the difference in value between the pixel of interest and the typical value is multiplied by the factor, so as to obtain an amplified difference value; and
   an adding sub-step in which the typical value is added to the amplified difference value, so as to obtain a modified value for the pixel of interest.

8. A method according to claim 1, comprising:
   a sequencing step in which respective pixels in a color image are successively designated, one by one, as the pixel of interest.

9. A method according to claim 1, comprising:
   a pixel selection step in which a set of pixels is formed, which includes the pixel of interest, on the basis of a predefined aperture, the difference in value being established on the basis of the set of pixels.

10. An image enhancer system, comprising:
    a saturation detector to detect a degree of color saturation that occurs in an image area;
    a filter arrangement to filter at least one spatial detail in the image area according to:
       a first value corresponding to a pixel of interest in the image area;
       a second value corresponding to one or more neighboring pixels neighboring the pixel of interest, and
    a difference in value between the first value and the second value, the difference in value amplified by a factor that increases linearly as the degree of color saturation increases starting from zero color saturation.

11. The image enhancer system of claim 10, further comprising a display device coupled to the saturation detector and the filter arrangement configured to display an enhanced color image.

12. An image enhancer system, comprising:
a saturation detector to detect a degree of color saturation that occurs in an image area;
a filter arrangement to filter at least one spatial detail in the image area according to:
a first chrominance value corresponding to a pixel of interest in the image area;
a second chrominance value corresponding to one or more neighboring pixels neighboring the pixel of interest;
a difference in chrominance value between the first chrominance value and the second chrominance value; and
an amplification of the difference in chrominance value by a factor that decreases as the degree of color saturation increases.

13. The image enhancer system of claim 12, further comprising:
determining a first a luminance value corresponding to the pixel of interest in the image area;
determining a second luminance value corresponding to the one or more neighboring pixels neighboring the pixel of interest; and
obtaining a difference in luminance value between the first luminance value and the second luminance value.

14. An image enhancer system, comprising:
a saturation detector to detect a degree of color saturation that occurs in an image area; and
a filter arrangement to filter at least one spatial detail in the image area according to:
a first luminance value corresponding to a pixel of interest in the image area;
a second luminance value corresponding to one or more neighboring pixels neighboring the pixel of interest;
a difference in luminance value between the first value and the second value; and
an amplification of the difference in luminance value by a factor that increases as the degree of color saturation increases.

15. The image enhancer system of claim 14, wherein the difference in chrominance value is amplified.

16. A method of image enhancement, comprising:
detecting a degree of color saturation in an image area; and
filtering at least one spatial detail in the image area by:
determining a first value corresponding to a pixel of interest in the image area, wherein the first value is at least one of: a first luminance value or a first chrominance value;
determining a second value corresponding to one or more neighboring pixels neighboring the pixel of interest, wherein the second value is at least one of: a second luminance value or a second chrominance value and
obtaining a difference in value between the first value and the second value, the difference in value amplified by a factor that increases linearly as the degree of color saturation increases starting from zero color saturation.

17. A method according to claim 16, wherein the difference in value that is amplified includes at least one of: a difference in luminance value or a difference in chrominance value.

18. A method of image enhancement, comprising:
detecting a degree of color saturation in an image area; and
filtering at least one spatial detail in the image area by:
determining a first value corresponding to a pixel of interest in the image area;
determining a second value corresponding to one or more neighboring pixels neighboring the pixel of interest;
obtaining a difference in value between the first value and the second value; and
amplifying the difference in value by a factor that decreases as the degree of color saturation increases, wherein the difference in value that is amplified includes a chrominance value.

19. A method according to claim 18, wherein, in the filtering step, the difference in value that is amplified comprises a luminance value.

* * * * *